US012561432B2

(12) United States Patent
Dinwiddie et al.

(10) Patent No.: US 12,561,432 B2
(45) Date of Patent: Feb. 24, 2026

(54) CYBERTHREAT HUNTING AND PROTECTION BASED ON CODIFIED INDICATORS OF BEHAVIOR

(71) Applicant: Goldman Sachs & Co. LLC, New York, NY (US)

(72) Inventors: Matthew Dinwiddie, Bedford, NH (US); Kenneth Jameson, Frisco, TX (US); Felicity Helt, Sunset, TX (US); Polina Tishina, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 19/214,041

(22) Filed: May 21, 2025

(65) Prior Publication Data

US 2025/0363211 A1 Nov. 27, 2025

Related U.S. Application Data

(60) Provisional application No. 63/650,322, filed on May 21, 2024.

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,516,053 | B1 * | 12/2016 | Muddu | ................ G06F 3/04847 |
| 11,228,612 | B2 | 1/2022 | Vajipayajula et al. | |
| 12,074,899 | B2 * | 8/2024 | Shaw | .................. H04W 12/088 |
| 12,095,784 | B2 * | 9/2024 | Suarez | ................ H04L 63/1408 |
| 2006/0191010 | A1 * | 8/2006 | Benjamin | ............. G06F 21/552 |
| | | | | 726/23 |
| 2017/0208084 | A1 | 7/2017 | Steelman et al. | |
| 2018/0004942 | A1 * | 1/2018 | Martin | .................. G06F 21/554 |
| 2018/0157605 | A1 * | 6/2018 | Edwards | ................. G06F 21/79 |

(Continued)

FOREIGN PATENT DOCUMENTS

KR 2015-0091775 A 8/2015

OTHER PUBLICATIONS

PCT International Search Report and Written Opinion, PCT Application No. PCT/IB2025/055248, Aug. 26, 2025, nine pages.

*Primary Examiner* — Kaveh Abrishamkar
(74) *Attorney, Agent, or Firm* — Fenwick & West LLP

(57) ABSTRACT

A method and system for identifying cybersecurity threats in a system environment based on Indicators of Behavior (IOBs) linked with threat actors. The system includes a threat hunter that ingests threat information, such as Indicators of Compromise (IOCs), Indicators of Activity (IOAs), and IOBs, for further analysis. A codification module generates a threat codex, a data structure that identifies threat actors using the stored information. A query module generates search queries utilized to find specific threats using information in the threat codex, while an analysis module identifies potential threat actors based on processed threat information. A simulation module simulates actions of identified threat actors to determine system vulnerabilities.

19 Claims, 7 Drawing Sheets

(56) References Cited

U.S. PATENT DOCUMENTS

| | | | |
|---|---|---|---|
| 2018/0255077 A1* | 9/2018 | Paine | H04L 63/1416 |
| 2020/0076835 A1* | 3/2020 | Ladnai | H04L 63/0227 |
| 2020/0186545 A1 | 6/2020 | Dichiu et al. | |
| 2020/0293653 A1* | 9/2020 | Huang | G06F 21/554 |
| 2021/0011999 A1* | 1/2021 | Bennett | G06F 16/1734 |
| 2022/0263858 A1* | 8/2022 | Bargnesi | H04L 63/0263 |
| 2023/0205888 A1 | 6/2023 | Tyagi et al. | |
| 2023/0229785 A1* | 7/2023 | Jurado | G06F 3/0483 |
| | | | 726/25 |
| 2023/0328095 A1* | 10/2023 | Chesla | H04L 63/1425 |
| | | | 726/23 |
| 2023/0421587 A1* | 12/2023 | Meyer | H04L 63/1425 |
| 2024/0070273 A1* | 2/2024 | Almogbil | G06N 20/20 |

* cited by examiner

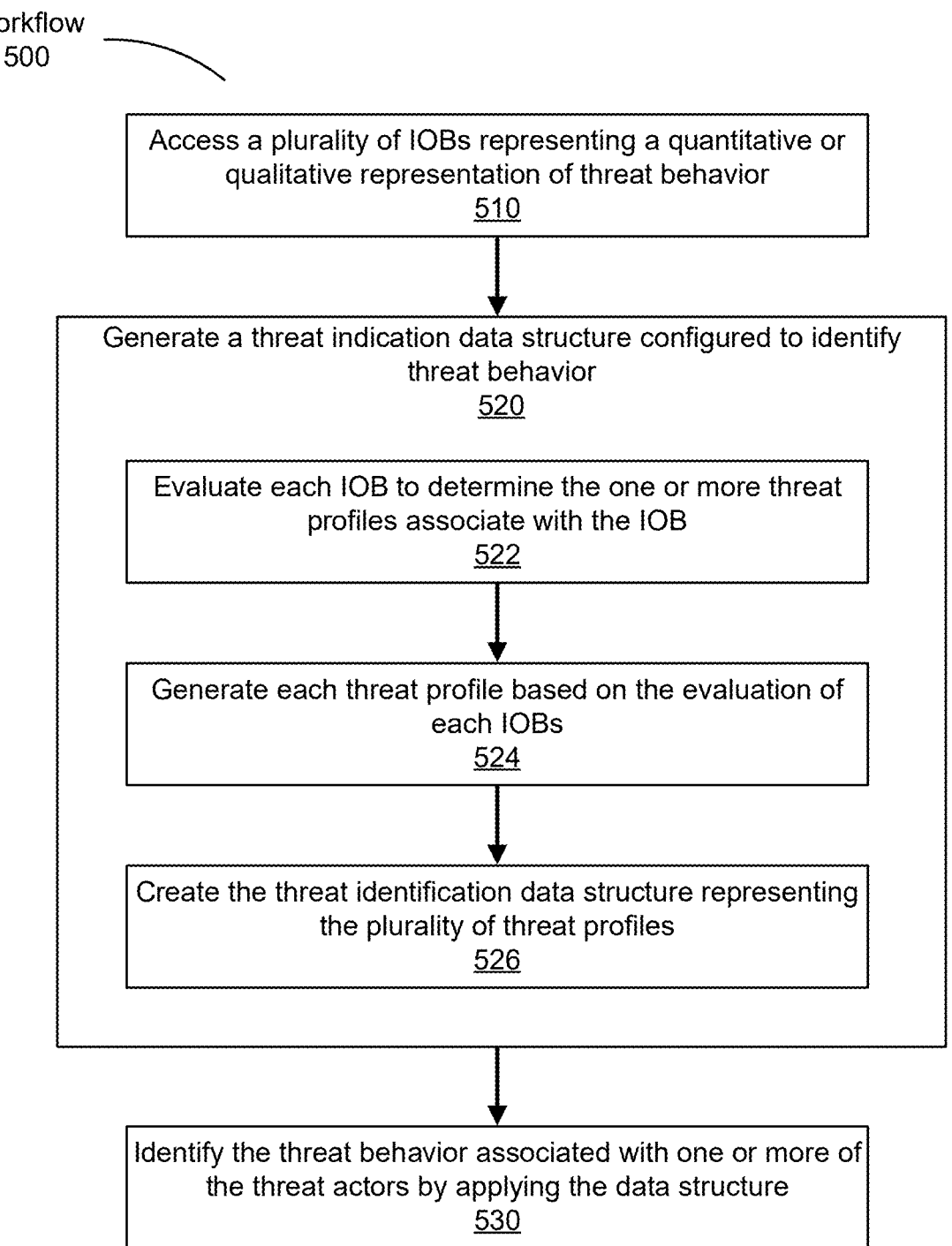

Workflow
500

Access a plurality of IOBs representing a quantitative or
qualitative representation of threat behavior
510

Generate a threat indication data structure configured to identify
threat behavior
520

Evaluate each IOB to determine the one or more threat
profiles associate with the IOB
522

Generate each threat profile based on the evaluation of
each IOBs
524

Create the threat identification data structure representing
the plurality of threat profiles
526

Identify the threat behavior associated with one or more of
the threat actors by applying the data structure
530

FIG. 5

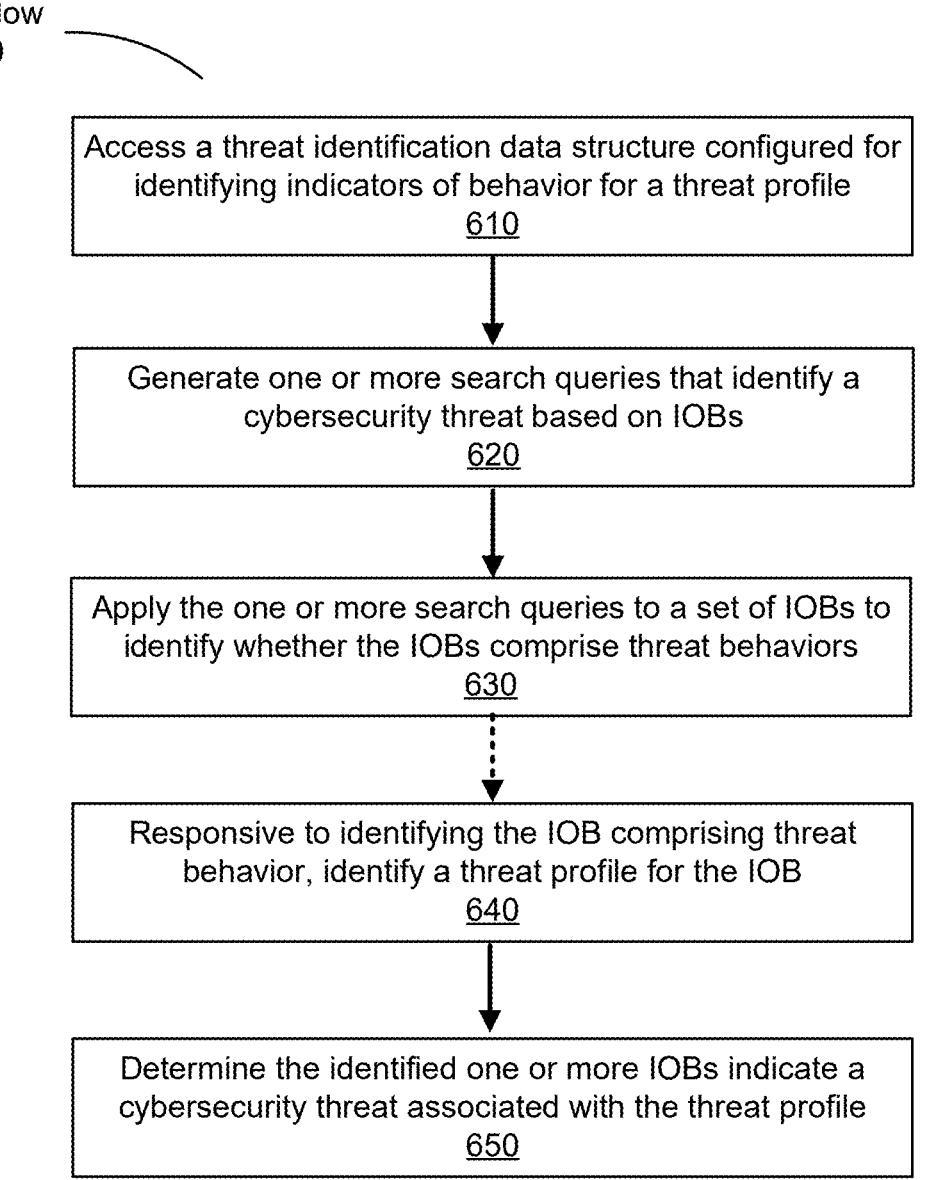

Workflow
600

Access a threat identification data structure configured for
identifying indicators of behavior for a threat profile
610

Generate one or more search queries that identify a
cybersecurity threat based on IOBs
620

Apply the one or more search queries to a set of IOBs to
identify whether the IOBs comprise threat behaviors
630

Responsive to identifying the IOB comprising threat
behavior, identify a threat profile for the IOB
640

Determine the identified one or more IOBs indicate a
cybersecurity threat associated with the threat profile
650

FIG. 6

CYBERTHREAT HUNTING AND PROTECTION BASED ON CODIFIED INDICATORS OF BEHAVIOR

CROSS REFERENCE TO RELATED APPLICATIONS

This application claims priority to U.S. Provisional Application No. 63/650,322, filed May 21, 2024, which is incorporated by reference in its entirety.

BACKGROUND

Field of Disclosure

The disclosed invention relates generally to the field of detecting cyberthreats using a system environment, and more specifically to detecting cyberthreats based on codified indicators of behavior.

Description of the Related Art

In recent years, with the rapid development of information technology and expanded proliferation of the internet, cybersecurity has seen advancements as well. Those measures, including firewalls, anti-virus software, intrusion detection systems, intrusion prevention systems, and other software or hardware-based security measures, serve as a defense against unauthorized intrusion and threats. However, the techniques and tools used by cybercriminals have also made significant progress, leading to increasing incidences of successful cyber-attacks.

The traditional method for identifying threats including as nefarious entities like hackers, adverse nation-states, etc. are based on known identifying signatures, or predetermined unique characteristics or patterns, for the, e.g., virus, worm, or other malware the entity employs. When the existing security system identifies these signatures in the data passing through it, it triggers an alert against them. However, as new threats are developed, the existing security measures can no longer identify these new threats by their signatures, making these attacks successful.

To overcome these limitations, new cybersecurity methodologies and systems need be developed, such as behavior-based threat detection. Instead of relying on known signatures, an approach that focuses on identifying indicative abnormal or malicious behavior within a network should be implemented.

SUMMARY

In some aspects, the techniques described herein relate to a method for identifying a cybersecurity threat in a system environment, the method including: accessing a plurality of indicators of behavior ("IOB"), each IOB including threat information representing a quantitative or qualitative representation of a threat behavior of threat actors; generate a threat identification data structure configured to identify threat behavior in a system environment, the threat identification data structure generated by: evaluating threat information of each IOB to determine threat behaviors associated with the IOB; generating, based on the evaluation, a plurality of threat profiles, each threat profile a representation of IOBs determined to have threat behaviors indicating malicious activity by one or more threat actors of a plurality of threat actors; and creating the threat identification data structure, the threat identification structure including the plurality of threat profiles and configured to analyze IOBs to identify threat behaviors associated with threat actors; identifying the cybersecurity threat and a threat actor associated with the cybersecurity threat by applying the threat identification data structure to a set of IOBs in system environment; and providing, to a system administrator, a notification of the identified cybersecurity threat and threat actor.

In some aspects, the techniques described herein relate to a method, wherein the IOB is a pattern of activity within they system environment.

In some aspects, the techniques described herein relate to a method, further including: measuring indicators of compromise ("IOCs") in the system environment, wherein each IOC represents pieces of forensic data that indicate that the system environment encountered malicious activity; and organizing the IOCs into IOBs based on forensic data in the IOCs.

In some aspects, the techniques described herein relate to a method, further including: measuring indicators of activity ("IOAs") in the system environment, wherein each IOA represents actions within the system environment that indicate that the system environment encountered malicious activity; and organizing the IOAs into IOBs based on the actions represented by the IOAs.

In some aspects, the techniques described herein relate to a method, wherein identifying the cybersecurity threat further includes: accessing the set of IOBs, wherein one or more of the IOBs in the set includes threat information representing the cybersecurity threat; and determining the quantitative or qualitative representation in the one or more IOBs in the set represent the cybersecurity threat.

In some aspects, the techniques described herein relate to a method, further including: associating the determined one or more IOBs in the set with one or more threat profiles of the plurality; and determining, based on the associated threat profiles, the threat actor is associated with the cybersecurity threat.

In some aspects, the techniques described herein relate to a method, wherein each threat profile includes a plurality of rules that classify IOBs as threat behaviors and associates the classified threat behaviors with various threat actors.

In some aspects, the techniques described herein relate to a method, wherein generating the threat identification data structure includes: providing IOBs to the system administrator; and receiving the threat identification structure from the system administrator in response.

In some aspects, the techniques described herein relate to a method, wherein generating the threat identification data structure includes: receiving threat profiles from one or more sources; organizing the threat profiles based on threat actor; and generate the threat identification data structure.

In some aspects, the techniques described herein relate to a method, wherein generating the threat identification data structure includes: applying one or more statistical analysis to the IOBs to analyze determine associations between IOBs and threat actors; and determining threat profiles for threat actors to based on the determined associations.

In some aspects, the techniques described herein relate to a method, wherein generating the threat identification data structure includes: training a machine learned model to determine threat actors based on threat information; inputting IOBs into the machine learned model, the machine learned model outputting threat profiles for threat actors; and generating the threat identification structure using the output threat profiles for threat actors.

In some aspects, the techniques described herein relate to a method for identifying a cybersecurity threat in a system environment, the method including: accessing, from a data-store, a threat identification data structure configured to identify the cybersecurity threat in the system environment using indicators of behavior ("IOB"), each IOB representing a quantitative or a qualitative representation of threat behaviors by threat actors; generating, based on the threat identification data structure, a search query configured to identify the cybersecurity threat in the system environment, wherein the search query is structured for identifying IOBs including threat information representing threat behaviors of the cybersecurity threat; applying the search query to a set of IOBs in the system environment to determine whether the IOBs include threat information representing threat behaviors of the cybersecurity threat; responsive to identifying one or more IOBs in the set represent the cybersecurity threat: identifying a threat profile in the threat identification data structure associated with the identified one or more IOBs; determining the threat profile indicates a threat actor; and transmitting, to a system administrator, an indication the identified cybersecurity threat and threat actor.

In some aspects, the techniques described herein relate to a method, wherein the search query is a key value pair that filters threat information in IOBs.

In some aspects, the techniques described herein relate to a method, wherein the search query is a reference table configured to apply threat profiles from the threat identification data structure to IOB datasets within the system environment.

In some aspects, the techniques described herein relate to a method, further including: receiving a natural language response representing generation of a search query to identify the cybersecurity threat; and processing the natural language response to generate the search query.

In some aspects, the techniques described herein relate to a method, further including: generating a recommendation of one or more actions in the system environment to address the identified cybersecurity threat and threat actor; and providing the recommendation in the indication.

In some aspects, the techniques described herein relate to a method, further including: automatically implementing the one or more actions in the system environment.

In some aspects, the techniques described herein relate to a method, wherein the one or more actions are based on the determined threat actor.

In some aspects, the techniques described herein relate to a method, further including: simulating one or more IOBs in the system environment to identify the one or more actions.

In some aspects, the techniques described herein relate to a method including: developing in code a set of filters with a combination of conditions, fields, and values to identify cyberthreat activity; configuring the code to automatically generate search queries for one or more data sources associated with a specified system or network based on the set of filters; configuring the code to automatically send the generated search queries to the one or more data sources associated with the specific system or network; configuring the code to automatically receive search query responses from the one or more data sources; configuring the code to automatically analyze and parse the search query responses for cyberthreat activity information based on the set of filters, which includes identifying one or more sequences or changes in the cyberthreat activity information over time found in the one or more data sources based on the set of filters; configuring the code to present or store the cyberthreat activity information; and executing the code.

In some aspects, the techniques described herein relate to a method, wherein executing the code includes executing the code on a schedule.

In some aspects, the techniques described herein relate to a method or Claim 10, further including: storing the search query responses from the one or more data sources in a data store or repository.

In some aspects, the techniques described herein relate to a method, further including: configuring the code to automatically generate additional search queries based on the analysis of the cyberthreat activity information; configuring the code to automatically send the additional search queries to the one or more data sources; configuring the code to automatically receive additional search query responses from the one or more data sources; configuring the code to automatically analyze and parse the additional search query responses; and configuring the code to automatically present or store results from analyzing and parsing the additional search query responses.

In some aspects, the techniques described herein relate to a method, further including: analyzing the cyberthreat activity information to apply context, enrichments, or tagging information to assist in review of the cyberthreat activity information.

In some aspects, the techniques described herein relate to a method, further including: analyzing the cyberthreat activity information to generate prioritization scoring for cyberthreat activities identified in the cyberthreat activity information; and prioritizing different cyberthreat activities based on the prioritization scores.

In various embodiments, methods and processes herein may be implemented by, or include in its implementation, a non-transitory computer readable storage medium storing computer program instructions. The computer program instructions, when executed by one or more processors, may cause the processors to perform various steps of the methods and processes. The non-transitory computer readable storage medium may also be implemented within a system environment.

BRIEF DESCRIPTION OF DRAWINGS

FIG. 5 illustrates an example workflow for generating a threat identification data structure configured for detecting cyberthreats in the system environment, according to an example embodiment.

FIG. 6 illustrates an example workflow for detecting cyberthreats in the system environment using search queries, according to an example embodiment.

Figure 1:
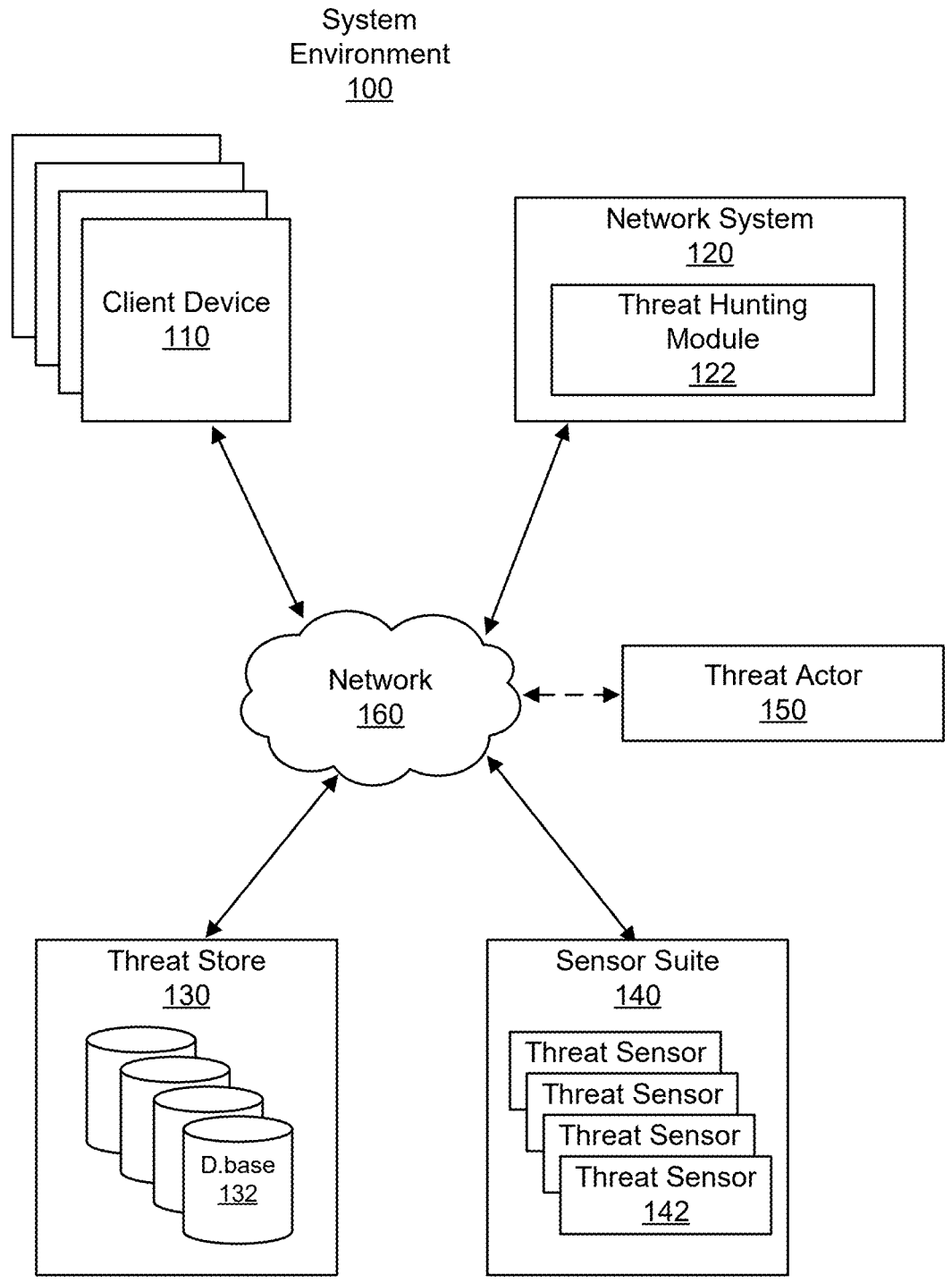
FIG. 1 illustrates a system environment configured for detecting cyberthreats based on codified indicators of behavior, according to an example embodiment.

The figures depict various embodiments for purposes of illustration only. One skilled in the art will readily recognize from the following discussion that alternative embodiments of the structures and methods illustrated herein may be employed without departing from the principles described herein.

<center>DETAILED DESCRIPTION</center>

<center>I. Introduction</center>

The modern cybersecurity landscape is heavily dependent upon indicators of compromise (IOCs) to detect security threats. An IOC is typically a piece of forensic data, such as data found in system log entries or files, which identifies potentially malicious activity on a system or network. Examples of typical IOCs include IP addresses, domain names, URLs, email addresses, file hashes or specific changes made to a system.

Relying on IOCs, however, is generally a reactive approach to threat hunting. This causes a greater degree of risk for those under attack as it offers only a post-compromise detection methodology. For instance, identifying an IOC such as a specific malware hash means that the harmful software has already infiltrated the system. Furthermore, IP addresses identified as a source of attack indicate that the attack has already occurred, with the detection only coming into play post-event.

A more effective strategy for threat detection involves the use of behavior-based threat detection, focusing on indicators of behavior (IOBs). An IOB may include tracking potential threat items such as binary names, ports, and protocols being used, command line strings, and specific directory paths (a more complete definition is provided hereinbelow). This approach goes beyond simple IOC detection, providing a more holistic, preventative approach to threat detection by capturing threat actors' modus operandi.

Importantly, IOCs and IOBs are not interchangeable technologically due to their inherent methodological differences and the disparate levels of information they provide. An IOC is a data point, a specific piece of evidence that indicates that a system may have been compromised that, as noted above, is often identifiable only after the incident has taken place. On the other hand, an IOB is a more dynamic attribute, capturing a potential threat actor's overall behavior and methodologies. This allows for a proactive stance, since an IOB isn't necessarily tied to an identified attack, but hints at a possible one. In effect, an IOC is like a footprint left at the scene of a crime, whereas an IOB is akin to surveillance footage that captures the modus operandi of potential perpetrators before or while the crime takes place. There exists, therefore, a fundamental difference in the nature and application of IOCs and IOBs, and the two should not be considered as interchangeable in threat detection.

Indeed, utilizing IOBs over IOCs brings a proactive approach to threat hunting, leading to improved security outcomes. For instance, identifying and blocking potentially malicious binaries before they execute or alerting an admin to unusual port activity can stop a compromise from even taking place. In another example, noting suspicious command line strings or suspicious directory paths may allow early detection and prevention of an exploit attempt.

However, employing an IOB-based approach is technically more challenging than relying on IOCs. Detecting IOBs necessitates a thorough, current mapping of threat actors' methodologies and strategies to compromise systems. Maintaining such a detailed, regularly updated knowledge-base overlapping with the monitoring systems can be technically complex. For instance, applying heuristic and behavior-based anomaly detection mechanisms may employ detailed algorithms, and the continuous updating of these mechanisms with current threat action data is a resource-intensive task.

<center>II. System Environment</center>

FIG. 1 illustrates a system environment 100 configured for detecting cyberthreats based on codified indicators of behavior, according to an example embodiment. In the illustrated example, the system environment includes a client device 110, a network system 120 including a threat hunting module 122 ("threat hunter 122"), a threat store 130 including one or more threat databases 132, a sensor suite 140 including one or more threat sensors 142, a threat actor 150, and a network 160. The system environment 100 may include one or more client devices 110 (e.g., 1, 2, 3, 5, ..., N client devices), may include one or more network systems 120 (e.g., 1, 2, 3, 5, ..., N network systems, not pictured), and may include one or more threat actors 150 (e.g., 1, 2, 3, 5, ..., N threat actors, not pictured). Some embodiments of system environment 100 have different systems and modules than those described herein. Similarly, functions of the systems and modules can be distributed within the system environment 100 in a different manner than is described herein. For instance, one or more of the threat sensors 142 of the sensor suite 140 may be located on the network system 120.

Within the system environment 100, client devices 110 interact with the network system 120 to perform various actions and operations, and the client devices 110 and network system 120 may store information pertinent to those actions and operations. In some cases, the actions, operations, and information may be sensitive in nature. For instance, the actions, operations, and information may be related to financially, contractually, or organizationally sensitive information. For example, the client devices 110 may use the network system 120 as a financial services provider, and the client devices 110 and network system 120 may exchange account information, security information, etc.

Because actions, operations, and information within the environment 100 are sensitive, one or more threat actors 150 may take various threat actions to compromise that sensitive information. To prevent this, the network system 120 employs the threat hunter 122 to identify IOBs representing upcoming, ongoing, or successful threat actions and/or behaviors of a threat actor 150. Indicators of behavior are quantitative or qualitative representations of behavioral threat actions taken by threat actor 150 in the system environment 100. Indicators of behavior may include, e.g., binary names, ports and protocols, command line strings, directory paths, etc., corresponding to the behaviors threat actors take when taking threat action to compromise resources in the system environment 100. Network system 120 may take various action in response to identifying IOBs corresponding to threat actions in the system environment 100.

The client device 110 can be any computing device configured to interact with the network system 120 and the threat hunter 122. Although FIG. 1 shows several client devices 110, the system environment 100 may include any number of such devices. The client devices 110 present one or more user interfaces via which users may interact with the network system 120 to take various actions and operations concerning sensitive information, and/or identifying threat actors 150 via indicators of behavior and taking appropriate actions. Various embodiments of the client devices 110 and user interfaces are described in greater detail below, with reference to FIG. 2.

The network system 120 can be any computing device configured to interact with the client device 110, threat store 130 and sensor suite 140. The network system 120 includes a threat hunter 122, and the network system 120 may utilize the threat hunter 122 to identify indicators of behavior from threat actors 150 within the system environment 100. As part of this process, at a high level, the network system 120 receives information representing IOBs from threat databases 132 of the threat store 130 and sensor information representing IOBs from one or more threat sensors 142 of the sensor suite 140. The threat hunter 122 codifies the IOBs into threat profiles representing the IOBs for certain threat actors 150 and uses the threat profiles to search IOBs (e.g., from sensor suite 140) to identify a threat actor 150 in the system environment 100. In some cases, the threat hunter 122 receives a search query generated by an administrator, or some other client device 110 within the system environment 100. The search query is, at a high level, a data representation of threat actions and IOBs corresponding to a threat actor 150. The threat hunter 122 may apply the generated search query to sensor information (e.g., IOBs) from the sensor suite 140 to determine if a threat actor 150 is taking threat actions in the system environment 100. Threat hunter 122 of the network system 120 is described in more detail in regard to FIG. 3.

The threat store 130 stores previously identified threat information. Threat information is cybersecurity forensic information associated with a threat actor and/or threat actions and is described in greater detail below. The threat information may be, e.g., previously threat behaviors and actions, and previously identified patterns of actions or behaviors. Generally, threat store 130 stores threat information in threat databases 132. The threat databases 132 are typically organized lists of observable values of threat information (e.g., IOBs) representing cyber threat activity. One or more of the threat databases 132 may store commercially available organized and categorized threat information, and one or more of the threat databases 132 may store threat information identified and categorized by the network system 120 in the system environment 100.

The sensor suite 140 measures actions, operations, information flow and storage, etc. in the system environment 100. In general, the measurements correspond to the actions, operations, information flow, etc. that may represent threat information (e.g., IOBs, threat actions, threat behaviors, etc.) of a threat action and/or threat actor seeking to compromise sensitive information in the system environment 100. One or more threat sensors 142 of the sensor suite 140 may be an external system or may be included in the network system 120 depending on the configuration of the system environment 100. Some example threat sensors 142 may include processes operating on, and information generated by, endpoint detection and response, email security tools, firewalls, external domain name server, public cloud security tools, and proxies.

As described above, a threat actor 150 is an entity that takes threat actions to compromise sensitive information within the system environment 100. Threat actions may include, e.g., spoofing IP addresses, squatting domain names and URLs, phishing password information via email addresses, changing file hashes or other manipulations of systems within the system environment 100, etc. Generally, a threat actor has some pattern of behavior that it takes when performing these threat actions. Accordingly, various actions, operations, and information within the system environment 100 will correspond to those threat actions and/or patterns of behavior. That is, each threat actor and/or threat action may correspond to various IOBs, and those IOBs (and sensor information representing those IOBs) can be used to identify, in real time or nearly real time, threat actions a threat actor 150 is making in the system environment 100.

As noted above, each threat actor 150 has some set of indicative behaviors that it uses to compromise sensitive information in the system environment 100. Thus, each threat actor 150 may be associated with one or more threat profiles, where the threat profile is some set of IOBs associated with that threat actor 150. As an example, consider a threat actor 150 that is a hostile state using various techniques to compromise the system environment. The threat actor 150 utilizes various threat vectors (e.g., phishing, spoofing, etc.) in an attempt compromise the system environment 100. Each of those threat vectors may be associated with one or more patterns of behavior which indicate the threat actor 150 is using the threat vector to comprise the system environment 100. Accordingly, the threat actor 150 is associated with one or more threat profiles, and each of the threat profiles corresponds to a threat vector and/or one or more IOBs utilized by that threat vector. In this manner, each threat actor 150 in the environment can be represented by a set of threat profiles, and IOBs corresponding to those threat profiles can be used to identify a threat actor 150. Generating and using threat profiles is described in greater detail below.

The network 160 provides the communication channels via which the other elements of the networked computing environment 100 communicate. The network 160 can include any combination of local area and wide area networks, using wired or wireless communication systems. In one embodiment, the network 160 uses standard communications technologies and protocols. For example, the network 160 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, some or all of the communication links of the network 160 may be encrypted using any suitable technique or techniques.

Client Device

Figure 2:
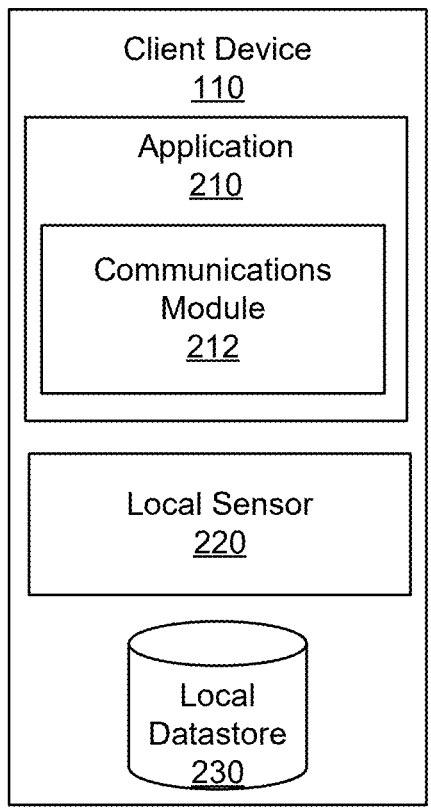
FIG. 2 illustrates an embodiment of a client device that may be used to interact with the network system, according to an example embodiment.

FIG. 2 illustrates an embodiment of a client device that may be used to interact with the network system, according to an example embodiment. In the illustrated example, the client device 110 includes an application 210 including a communications model 212, a local sensor 220, and a local datastore 230. In other embodiments, the client device 110 includes different or additional elements. In addition, the functions may be distributed among the elements in a different manner than described.

The client device 110 includes an application 210. The application 210 is software that executes on the client device 110 to enable interaction with, e.g., other client devices 110, the threat hunter 122 of the network system 120, the threat store 130, and the sensor suite 140. The application 210 may be used to generate a search query for a threat, may be provided an identified threat report, may generate instructions to remedy an identified threat, etc. To that end, the application 210 includes a communications module 212 that sends information (e.g., threat information, search queries, search reports, etc.) to the network system 120 over the network 160 and receives and/or process information from elements connected to the client device 110 in the system environment 100.

The client device 110 includes a local sensor 220. The local sensor 220, like the sensor suite 140, measures actions, operations, and stored information in the system environment 100 that may be used to identify IOBs. The client device 110 may transmit the measurements to the network system 120 or process the measurements to identify IOBs locally.

The client device includes a local datastore 230. The local datastore 230 includes one or more computer-readable media that store the data used by the client device 110. For example, the local datastore 230 may include stored sensitive information, generated threat information, IOBs, etc.

Threat Hunting Module

Figure 3:
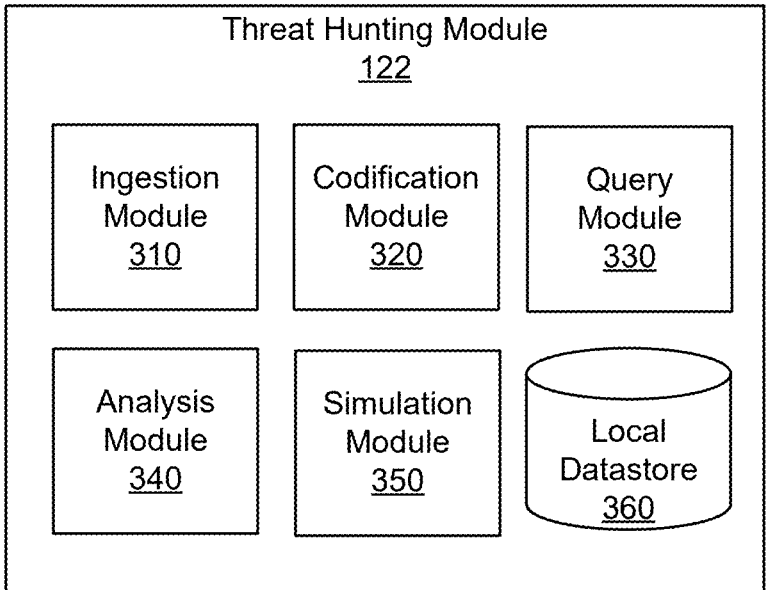
FIG. 3. illustrates a threat hunting module configured for detecting cyberthreats based on codified indicators of behavior, according to an example embodiment.

As described above, the network system 120 includes a threat hunter 122 configured for identifying threat actor 150 in the system environment 100 based on indicators of behavior. FIG. 3. illustrates a threat hunting module configured for detecting cyberthreats based on codified indicators of behavior, according to an example embodiment. As illustrated, the threat hunter 122 includes an ingestion module 310, a codification module 320, a query module 330, an analysis module 340, a simulation module 350, and a local datastore 360. Some embodiments of threat hunter 122 have different systems and modules than those described herein. Similarly, functions of the systems and modules can be distributed within the threat hunter 122 in a different manner than is described herein.

The threat hunter 122 includes an ingestion module 310 that ingests threat information. As noted above, threat information may be indicators of compromise (IOCs), indicators of attack/activity (IOAs), indicators of behavior (IOBs), etc., generated in the system environment 100.

IOCs are pieces of forensic data that suggest a system or network has been breached. They are artifacts or remnants left by malicious activities of threat actor 150 that may help threat hunter 122 identify past security incidents. As an example, an IOC may be an identification of a virus or by a virus scanner on a computer. As another example, an IOC may be a file on a system whose security hash matches that of known malware, or a network log showing an outbound connection to IP addresses listed on threat intelligence feeds as a command-and-control server. IOCs may be used in a reactive manner, e.g., by matching IOCs to signatures, to identify and investigate a previously accomplished security compromise.

IOAs are those methods and information that detect the actions and tactics used by network system 120 during an intrusion. IOAs attempt to identify malicious intent and activities in real-time, regardless of the tools or malware used. As an example, an IOA may be a client device 110 making multiple attempts at logging into network system 120. As another example, an IOA may be identifying a process attempting to gain higher system privileges, such as a user running a command to access restricted files or identifying unusual authentication requests across multiple systems in the system environment 100.

An IOB is a pattern or actions that shows how a person, system, or a program is behaving—it may help identify something unusual or harmful might be happening within the system environment 100 based on the actions of someone or something. In other words, IOBs represent unusual or anomalous behaviors by elements in a system environment 100 that deviate from established patterns. The threat hunter 122 utilizes IOBs to predict and identify potential threats based on behavioral changes. IOBs are oftentimes based on a pattern generated by IOAs (and sometimes IOCs) or some other measurement in the system environment 100. As a simple example, an IOB may include identifying an employee who typically works daytime hours is accessing sensitive data late at night. As a more technical example, an IOB may be detecting a user that does not usually use PowerShell, downloading an executable from a site that is new across the organization, the downloaded file disables security tools, and then a process creates new files rapidly. Additionally, an IOB could be a user logging in from a new device, from a new location, and then attempting to escalate user privileges, or several account logins from geographically distant locations occur within a short timeframe.

The threat hunter 122 can ingest threat information from client devices 110, network system 120, threat store 130, sensor suite 140, etc. For instance, the threat hunter 122 can receive IOCs from a client device 110, access IOBs from threat store 130, and receive IOCs from sensor suite 140, although other examples are possible. Whatever the source, the threat hunter 122 ingests the threat information for use in identifying a potential threat actor 150 attempting to compromise sensitive information in the system environment 100.

The threat hunter 122 can also organize the received threat information in various ways. For example, the threat hunter 122 can (1) organize IOCs and IOAs (e.g., received from a threat store 130 or sensor suite 140) into corresponding IOBs, (2) identify and separate each type of indicator, (3) organize the received information based on attributions to a threat actor 150 or threat profiles for that threat actor 150, (4) organize received information based on the threat vector, (5) other genialized techniques for categorizing threat information, etc. Typically, the threat information is organized such that the threat hunter 122 can identify deviations in the threat activities between, e.g., times, places, client devices, environments, etc. Stated differently, the received information is organized such that the threat hunter 122 can identify patterns in the behavior that indicate a threat actor 150.

The threat hunter 122 can ingest information at any number of cadences. For instance, threat hunter 122 may threat ingest information for codification and/or searching at regular intervals, at the request of client device 110, whenever trigger actions, operations, or storages occur in the system environment 100, etc. In turn, threat hunter 122 may organize, analyze, or process any portion of the ingested information at similar, or different, cadences to ingestion. For instance, ingestion of threat information may be a continuous process, while analysis for of that threat may occur less frequently.

The threat hunter 122 includes a codification module 320 that generates a threat codex. A threat codex is a data structure configured to identify threat actors using the information stored therein. The threat codex includes one or more threat profiles. A threat profile is a data object within the data structure that includes an identified set of threat behaviors that indicate malicious activity by threat actor 150. Typically, each threat profile includes one or more IOBs representing threat patterns generated by the threat actor 150 when taking actions to compromise sensitive information. In effect, each threat profile is a set of rules that classify IOBs as threat behaviors and associates the classified threat behaviors with various threat actors 150. Generally, threat hunter 122 identifies a threat actor 150 when the threat codex (or some portion thereof) is applied to threat information, and some threshold criteria for identification is met (e.g., probability, number of threat profiles satisfied, number of IOBs, etc.).

Threat hunter 122 can use the codification module 320 to generate a threat codex in a variety of ways. In a first example, the codification module 320 can query an administrator of the network system 120 to generate the threat codex, and the administrator may provide the threat codex in response (e.g., via client device 110). In a second example, the codification module 320 can access or receive threat profiles from various sources (e.g., threat store 130, client device 110), organize the threat profiles (e.g., by threat actor 150), and generate the threat codex accordingly. In a third example, the codification module 320 can apply one or more statistical analysis to threat information to determine threat profiles for threat actors 150. In a fourth example, the codification module 320 can train a model to identify threat actors 150 based on threat information. The model may explicitly generate threat profiles, or the threat profiles may be included as latent information in the model such that they are explicitly required (e.g., weights and parameters in a neural network). The model may be, e.g., a neural network, a large language model, a support vector machine, a decision tree, etc. Whatever the case, the codification module 320 codifies threat information into threat profiles for threat actors 150 such that the threat hunter 122 can analyze threat information to identify malicious actions in the system environment 100.

The threat hunter 122 includes a query module 330 to generate search queries. A search query is a data object that leverages information in the threat codex to identify threat actors 150 using measured or accessed threat information. A search query may be a key value pair that filters threat information, or a reference table configured to apply information from the threat codex to different and/or disparate datasets within the environment. In some cases, the query module 330 may include natural language processing that inputs a natural language request for a search and outputs the appropriate data object (e.g., search query) for searching. In some examples, functionality of the query module 330 may be built into the model of the threat codex. Whatever the case, in effect, the query module 330 generates search queries that utilize native field value schemas, logic operators, and functions present in the threat codex to generate data objects for targeting and identifying threat information in on specific platforms or networks.

The query module 330 may be configured to be accessible via an application programming interface (API) such that other devices in the system environment 100 can generate and use search queries. As an example, a client device 110 may generate a request for a search query to probe its local network for threat actors seeking to compromise its sensitive information. The query module 330 may input the response and generate the appropriate search query (e.g., based on the client device 110, its local network, the type of threat actors and vectors at play, etc.) and provide that search query to the client device.

The threat hunter 122 includes an analysis module 340 that analyzes information processed by, e.g., the threat codex or a search query to identify a threat actor 150 and their behaviors in the system environment 100. Identifying threat actors may include programmatically identifying, extracting, filtering, and/or aggregating threat information using the threat codex (or some representation thereof—e.g., a search query). The programmatic analysis can include identification of sequences and changes over time in the threat information that represent a threat actor 150 is at play in the system environment 100. Additionally, the analysis module 340 may provide, e.g., a likelihood that the indicators represent a first threat actor or a second threat actor or may provide a likelihood that the indicators represent a threat actor or no threat actor. The analysis may also provide an analysis of which IOBs, threat profiles, etc., are being used, have been identified, etc.

The analysis module 340 can store and present the analyzed threat information. For example, the analysis module 340 can generate a data file representing the results and transmit that data file for presentation on client device 110. The results data can be presented and stored in a variety of formats to include, but not limited to, electronic communications, electronic documents, dashboards, incident management platforms, data repositories, etc.

In some cases, analysis module 340 may provide a recommendation of actions to take to contain threat actor 150, and the analysis module 340 may cause the network system 120 to implement those actions. Some example actions include, but are not limited to, changing firewall rules or configurations, creating additional atomic detections within an EDR or SIEM, deleting email messages from inboxes, restricting web traffic to and from specific locations or domains, adapting conditional access policies, sending an out-of-band multifactor authentication (MFA) challenge, performing targeted breach attack simulations against specific assets, routing suspicious traffic to deception environment, performing user endpoint behavior analysis, or analyzing vendor logs for anomalies. Notably, these are just examples and additional recommendation actions are also possible. The analysis module 350 may receive implement the actions in response to an instruction by the system administrator.

In some example configurations, analysis module 340 may cause the network system 120 to automatically perform one or more of the recommended actions. The network system 120 may automatically perform the actions for a variety of reasons such as, e.g., a risk associated with the identified threat actor, IOBs, etc., the identified threat actor, the affected systems, etc. Notably, these are just examples and additional automatic actions are also possible.

The threat hunter 122 includes a simulation module 350 configured to simulate actions of threat actor 150 in the system environment 100 to determine a vulnerability of elements in the system environment 100. To do so, the simulation module 350 identifies one or more threat actors 150 and one or more threat profiles from the threat codex. Simulation module 350 extracts the IOBs common to the selected threat profiles and/or threat actors, and generates, e.g., threats and/or threat information that simulates those IOBs. For instance, the simulation module 350 may execute one or more IOAs associated with an IOB on the appropriate elements in the system environment 100 to simulate an attack from a threat actor 150 (having threat profiles associated with those IOB). The simulation module 350 can diagnose the response and security of the detected elements to determine a vulnerability of those elements. As with above, the threat hunter 122 can generate and implement actions to address the determined vulnerabilities. Some of those actions may be, e.g., changing policy settings in the EDR, restricting the amount of data that can go to specific domains, limiting or revoking privileged access, dynamically isolating resources, deleting suspicious files, or restricting execution. Notably, these are just examples and additional actions are also possible.

Additionally, threat hunter 122 is configured to interact with client device 110 throughout the process of identifying a threat actor 150. For example, the threat hunter 122 may receive threat information from client device 110 and threat hunter 122 may analyze that threat information to identify a threat actor. In an example, threat hunter 122 may receive a search query from client device 110 and threat hunter 122 may use that search query to identify threat actor 150 in the system environment 100. In an example, threat hunter 122 may provide a threat codex to client device 110 and client device 110 may utilize the threat codex to identify a threat in the system environment 100. In an example, threat hunter 122 may transmit an analysis of potential threat actors found in the system environment 100 based on received IOBs, and the client device 110 (e.g., based on input from an administrator) may provide a confirmation of the threat actors and remedial action instructions. In an example, threat hunter 122 may receive instructions to simulate threat actor 150 in the environment from client device 110 and simulate that threat actor 150 in response. In an example, threat hunter 122 may query a client device for codification of threat information and receive, e.g., some portion of a threat codex in response. Other examples are also possible.

Finally, as noted above, threat hunter 122 generating threat profiles and a threat codex may include generating a data object. In some configurations the data object is machine readable code or an image that, when executed, performs the functions of the threat profiles and threat codex. So, for instance, generating a threat codex may include developing threat profiles for threat actors, with each threat profile representing a set of filters with a combination of conditions, fields, and values to identify cyberthreat activity (e.g., IOBs). The threat codex may be generated as code executable by one or more processors.

Moreover, generating search queries based on the threat codex may include automatically generating search queries for one or more data sources associated with a specified system (e.g., the system thought to be under attack or compromised) based on the threat profiles (e.g., set of filters) in the threat codex. The generated search queries may be formed by threat hunter 122 automatically generating code (or modifying code) that performs the search queries in the system environment. The generated search queries (and corresponding code) may be automatically configured to send and receive responses to the search queries. The threat hunter 122 (e.g., by generating, modifying, executing, etc., code) analyzes and parses the search query responses for cyberthreat activity information based on the threat profiles (e.g., filters). The analysis and parsing may identify one or more sequences or changes in the cyberthreat activity information over time found (e.g., an IOB) in the one or more data sources based on the set of filters. The results of the analysis may be presented or stored.

Figure 4:
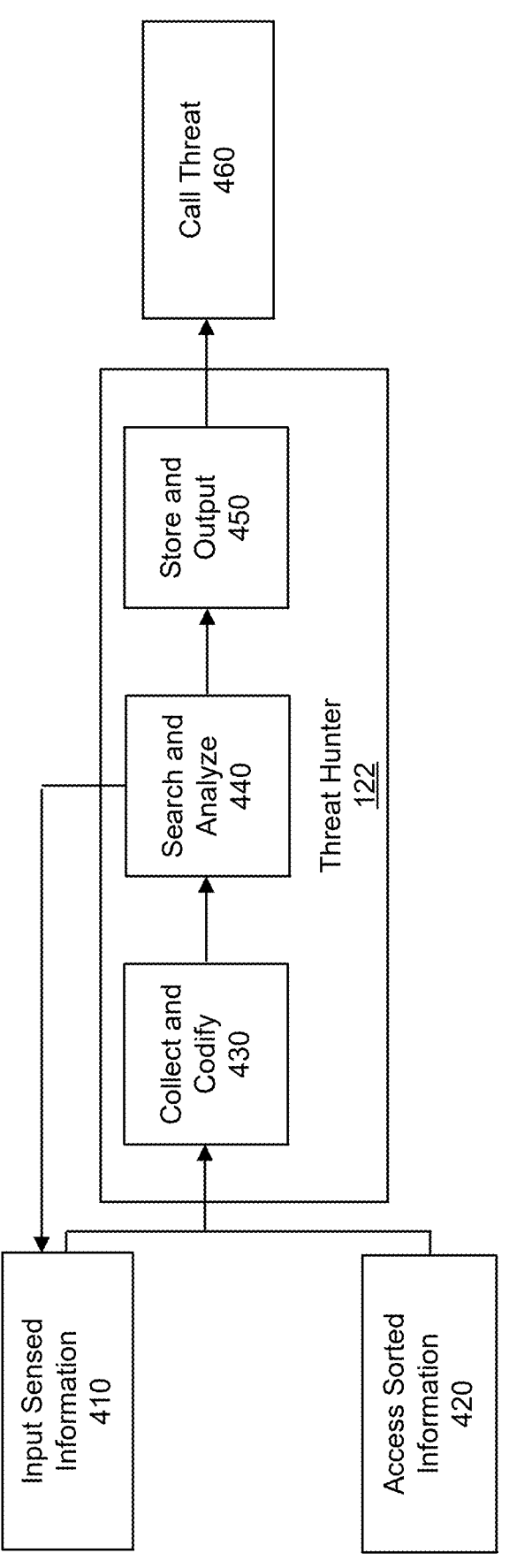
FIG. 4 illustrates a workflow diagram for detecting cyberthreats, according to an example embodiment.

FIG. 4 illustrates a workflow diagram for detecting cyberthreats, according to an example embodiment.

At 410 and 420, threat hunter 122 inputs threat information. The threat information may be, e.g., IOAs, IOBs, and IOCs. The threat information may be previously identified threat information from threat store 130 and/or real-time or approximately real time threat information from sensor suite 140.

At 430, threat hunter 122 collects the threat information for codification, as described above. For instance, threat hunter 122 may organize IOAs into IOBs according to various threat profiles. Threat hunter 122 generates a threat codex including various threat profiles for threat actors. The threat profiles represent various IOBs that correspond to the malicious actions those threat actors may take in the system environment 100. When collecting (e.g., at 410 and 420) threat information, threat hunter 122 may organize the threat information based on the threat codex (e.g., by IOB, threat profile, threat actor, etc.). The threat profile(s) and/or threat codex may be represented by a data object such as an array, a ruleset, etc.

At 440, threat hunter 122 generates a search query to identify threat actor 150 in system environment 100. The search query is a data object that takes some portion of the threat codex and configures it for application to threat information received from elements in the system environment 100. Threat hunter 122 accesses threat information, e.g., from sensor suite 140, and applies the search query to the threat information. The search query identifies whether threat actor 150 is performing malicious actions in the system environment 100 by comparing the threat information to the representation of the threat codex present in the search query. Threat hunter 122 may analyze the various identifications made when using the search query using methods set forth above.

At 450, threat hunter 122 stores and/or outputs a threat analysis. The threat analysis is some representation of an identification of threats and/or threat actors in the system environment 100 when the search query (or threat codex) is applied to threat information. The threat analysis may be a list of threat actors and a likelihood that the threat actors are performing threat actions in the system environment 100. The threat analysis may also provide IOBs relevant to the analysis.

At 460, threat hunter 122 calls a threat. Calling a threat means threat hunter 122 determines that one or more threat actor 150 is present and performing threat actions in the system environment 100. In some cases, the threat hunter 122 may autonomously call a threat in situations where the likelihood of the threat actor performing malicious actions. In some cases, threat hunter 122 may provide the threat analysis to an administrator (e.g., on client device 110) and the administrator may call the threat. Threat hunter 122 (or the administrator) may indicate and actuate various remedial or containment actions in the system environment 100 based on the called threat.

FIG. 5 illustrates an example workflow for generating a threat identification data structure configured for detecting cyberthreats in the system environment, according to an example embodiment. The method described by the workflow 500 may include additional or fewer steps, and/or the steps may occur in a different order. Moreover, one or more of the steps may be repeated or omitted.

In the workflow 500, one or more client devices 110 are interacting with network system 120 and exchanging sensitive information as part of that process. Some number of threat actors (e.g., threat actor 150) seek to compromise elements of the network system 120. Each threat actor is associated with one or more threat profiles, each of the threat profiles describing the behaviors the threat actor 150 takes when trying to compromise sensitive information.

In this example, the system environment 100 includes a threat store 130 and a sensor suite 140 that store and measure IOBs, respectively. The IOBs may represent threat actions corresponding to one or more threat behaviors, and those threat behaviors may correspond to a threat profile. Depending on the circumstances, the IOBs may be a quantitative or qualitative representation of the threat behavior. Stated differently, the threat store 130 and sensor suite 140 generate the data that the network system 120 analyzes to determine if evidence of a threat behavior associated with a threat actor 150 are present in the network system 100.

The network system 120 includes a threat hunter 122. The threat hunter 122 is configured to identify a cybersecurity threat (e.g., a threat actor 150 establishing a threat behavior by performing threat actions) in the system environment 100.

To do so, the network system 120 accesses 510 IOBs. The network system 120 may access IOBs from the threat store 130 or the sensor suite 140, depending on the configuration of the threat hunter 122. The accessed IOBs comprise information representing threat behaviors of a threat actor 150 in the system environment 100. The IOBs may be either a quantitative or qualitative representation of the threat behaviors of the threat actor 150. Moreover, the threat information of each IOB may be associated with a threat profile associated with the threat actor.

The threat hunter 122 generates 520 a threat identification data structure (a "threat codex") to identify threat behaviors in the system environment 100.

To do so, the threat hunter 122 evaluates 522 each IOB to determine threat behaviors associated with each IOB. Identifying threat behaviors may include associating the qualitative or quantitative threat information with a threat behavior.

The threat hunter 122 generates 524 threat profiles based on the evaluation of the IOBs. Each threat profile is particular set of threat behaviors (and their associated IOBs) that indicate malicious activity by a threat actor. In effect, the threat profiles are a set of "rules" that classify IOBs as threat behaviors and associates the classified threat behaviors with various threat actors.

The threat hunter 122 generates 526 the threat codex. The threat codex is a data structure comprising the generated threat profiles. The threat codex, when applied to measured or accessed IOBs in the system environment 100, classifies the IOBs as various threat behaviors and associates the threat behaviors with various threat actors.

The network system 120 identifies 530 a cybersecurity threat in the system environment 100. To do so, the network system 120 applies the threat codex to one or more IOBs in the system environment 100. The IOBs may be measured, in real time, by the sensor suite 140. In turn, the network system 120 may take various action to terminate the cybersecurity threat.

FIG. 6 illustrates an example workflow for detecting cyberthreats in the system environment using search queries, according to an example embodiment. The method described by the workflow 600 may include additional or fewer steps, and/or the steps may occur in a different order. Moreover, one or more of the steps may be repeated or omitted.

In this example workflow 600, again, one or more client devices 110 are interacting with network system 120 and exchanging sensitive information as part of that process. Some number of threat actors (e.g., threat actor 150) seek to compromise elements of the network system 120. Each threat actor is associated with one or more threat profiles, each of the threat profiles describing the behaviors the threat actor 150 takes when trying to compromise sensitive information. The network system 120 can utilize a threat codex to evaluate whether one or more threat actors are taking threat actions and establishing threat behaviors using search queries.

To do so, the network system 120 a threat identification data structure (the "threat codex"). The treat codex includes threat profiles. Each threat profiles includes a number of threat behaviors associated with the threat profile, and each of the threat behaviors may be represented by one or more IOBs comprising threat information in the system environment 100. The threat information may be quantitative or qualitative information, depending on the system environment 100.

The network system 120, using a threat hunter 122, generates one or more search queries to identify a cybersecurity threat in the system environment. A search query is some request generated by, e.g., a client device seeking to identify a cybersecurity threat and/or threat actor in the system environment 100 using threat information. Generally, the threat hunter 122 generates a search query using the one or more threat profiles and/or threat actors present in the codex. As an example, the threat hunter 122 may receive an input from a client device 110 to search for a particular threat behavior, and the search behavior access threat profiles associated with that threat behavior from the threat codex and generates a search query to identify that threat behavior in the environment.

The network system network system 120, using the threat hunter 122, applies the search query to one or more IOBs in the system environment 100. The IOBs may be accessed from the threat store 130 or the sensor suite 140. By applying the search queries to the IOBs, the network system 120 identifies qualitative or quantitative threat information in the IOBs associated with threat behaviors. Responsive to the identification, the threat hunter 122 identifies a threat profile associated with the IOBs identified as representing threat behaviors. The threat hunter 122 determines that the one or more identified IOBs indicates a cybersecurity threat (e.g., a threat actor) associated with the threat profile.

Additional Configurations

As described above, threat hunter 122 generates a threat codex to identify threat actors. Notably, in some configurations, threat hunter 122 generates a threat codex to identify threat actors in the system environment 100. That is, the threat profiles and threat behaviors of threat actors in the threat codex may be tailored to the system environment 100.

To provide context, consider a first system environment configured for, e.g., secure financial transactions, and a second system environment configured for, e.g., secure information storage. Each of these system environments may be configured in a different element—e.g., including different system elements, usage characteristics, data connections, etc. As such, the various actions, and behaviors a threat actor takes to infiltrate each system environment may be different and tuned to each environment individually. More simply, a threat actor may act one way to try and compromise a financial transactions system, and may act another way to compromise a secure storage system.

In turn, threat hunter 122 is configured to generate a threat codex tailored for the system environment 100 which the network system 120 monitors. So, using the example above, threat hunter 122 generates a first threat codex configured for detecting threat actors in a financial transactions system, and a second threat codex configured for detecting threat actors in a secure storage system. This can mean that the threat profiles and threat behaviors for the same threat actor can be different for different system environments because elements of the system are different and the threat actor may have correspondingly different IOBs.

Moreover, threat hunter 122 can tune a threat codex for the system environment based on observations within (1) that system environment, (2) similar system environments, (3) different system environments, etc. For instance, threat hunter 122 may (1) modify a threat codex for a system environment based on observations of a threat actor in that system environment, (2) modify a threat codex based on observations of a threat actor in a system environment that is similarly configured to the system environment (e.g., similar network systems, similar operations, etc.), (3) modify a threat codex based on observations of a threat actor in a system environment that is differently configured to the system environment (e.g., based on known differences between different elements of the systems, based on known modifications the threat actor takes between systems, etc.).

III. Computer System

Figure 7:
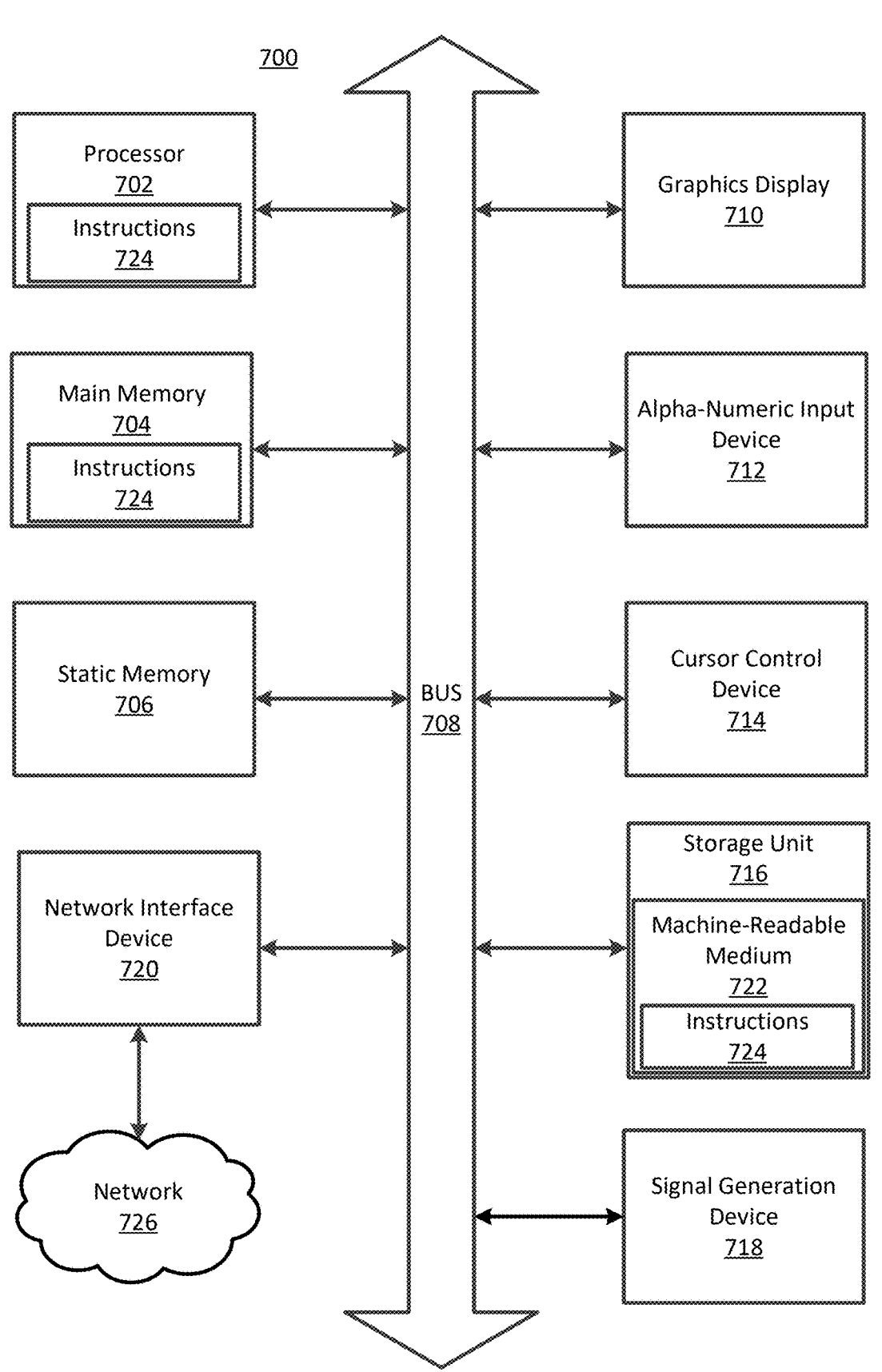
FIG. 7 is a block diagram illustrating components of an example machine for reading and executing instructions from a machine-readable medium, according to an example embodiment.

FIG. 7 is a block diagram illustrating components of an example machine for reading and executing instructions from a machine-readable medium, according to an example embodiment. Specifically, FIGS. 1-3 show a diagrammatic representation of computer systems employed throughout the Specification. These systems can be in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the systems described in FIG. 1. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 (e.g., network 170) via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

IV. Additional Considerations

In the description above, for purposes of explanation, numerous specific details are set forth in order to provide a thorough understanding of the illustrated system and its operations. It will be apparent, however, to one skilled in the art that the system may be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer-readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B is true (or present).

In addition, the use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for implementing the functionality described herein. Thus, while particular embodiments and applications have been illustrated and described, it is to be understood that the disclosed embodiments are not limited to the precise construction and components disclosed herein. Various modifications, changes, and variations, which will be apparent to those, skilled in the art, may be made in the arrangement, operation, and details of the method and apparatus disclosed herein without departing from the spirit and scope defined in the appended claims.

What is claimed is:

1. A method for identifying a cybersecurity threat in a system environment, the method comprising:
   accessing a plurality of indicators of behavior ("IOB"), each IOB including threat information representing a quantitative or qualitative representation of a threat behavior of threat actors, wherein threat actors are entities responsible for cybersecurity threats in system environments;
   generate a threat identification data structure configured to identify threat behavior in a system environment, the threat identification data structure generated by:
      evaluating threat information of each IOB to determine threat behaviors associated with the IOB;
      generating, based on the evaluation, a plurality of threat profiles, each threat profile a representation of IOBs determined to have threat behaviors indicating malicious activity by one or more threat actors of a plurality of threat actors; and
      creating the threat identification data structure, the threat identification structure comprising the plurality of threat profiles and configured to analyze IOBs to identify threat behaviors associated with threat actors;
   applying the threat identification structure to a set of IOBs in the system environment to:
      identify a threat profile of the plurality of threat profiles in the threat information data structure based on the set of IOBs, and
      identify, based on the identified threat profile, a threat actor of the plurality of threat actors is responsible for the cybersecurity threat; and
   responsive to identifying the threat actor is responsible for the cybersecurity threat, providing, to a system administrator, a notification of the identified cybersecurity threat and the identified threat actor.

2. The method of claim 1, wherein the IOB is a pattern of activity within the system environment.

3. The method of claim 2, further comprising:
   measuring indicators of compromise ("IOCs") in the system environment, wherein each IOC represents pieces of forensic data that indicate that the system environment encountered malicious activity; and
   organizing the IOCs into IOBs based on forensic data in the IOCs.

4. The method of claim 2, further comprising:
   measuring indicators of activity ("IOAs") in the system environment, wherein each IOA represents actions within the system environment that indicate that the system environment encountered malicious activity; and
   organizing the IOAs into IOBs based on the actions represented by the IOAs.

5. The method of claim 1, wherein identifying the cyber-security threat further comprises:

accessing the set of IOBs, wherein one or more of the IOBs in the set includes threat information representing the cybersecurity threat; and determining the quantitative or qualitative representation in the one or more IOBs in the set represent the cybersecurity threat.

6. The method of claim 5, further comprising:

associating the determined one or more IOBs in the set with one or more threat profiles of the plurality; and determining, based on the associated threat profiles, the threat actor is associated with the cybersecurity threat.

7. The method of claim 1, wherein each threat profile comprises a plurality of rules that classify IOBs as threat behaviors and associates the classified threat behaviors with various threat actors.

8. The method of claim 1, wherein generating the threat identification data structure comprises:

providing IOBs to the system administrator; and receiving the threat identification structure from the system administrator in response.

9. The method of claim 1, wherein generating the threat identification data structure comprises:

receiving threat profiles from one or more sources;

organizing the threat profiles based on threat actor; and generate the threat identification data structure.

10. The method of claim 1, wherein generating the threat identification data structure comprises:

applying one or more statistical analysis to the IOBs to analyze determine associations between IOBs and threat actors; and determining threat profiles for threat actors to based on the determined associations.

11. The method of claim 1, wherein generating the threat identification data structure comprises:

training a machine learned model to determine threat actors based on threat information;

inputting IOBs into the machine learned model, the machine learned model outputting threat profiles for threat actors; and generating the threat identification structure using the output threat profiles for threat actors.

12. A method for identifying a cybersecurity threat in a system environment, the method comprising:

accessing, from a datastore, a threat identification data structure configured to identify the cybersecurity threat in the system environment using indicators of behavior ("IOB"), each IOB representing a quantitative or a qualitative representation of threat behaviors by threat actors, wherein threat actors are entities responsible for cybersecurity threats in system environments;

generating, based on the threat identification data structure, a search query configured to identify the cybersecurity threat in the system environment, wherein the search query is structured for identifying IOBs comprising threat information representing threat behaviors of the cybersecurity threat;

applying the search query to a set of IOBs in the system environment to determine whether the IOBs comprise threat information representing threat behaviors of the cybersecurity threat; and responsive to identifying one or more IOBs in the set represent the cybersecurity threat:

identifying a threat profile in the threat identification data structure associated with the identified one or more IOBs;

determining the threat profile indicates a threat actor; and transmitting, to a system administrator, an indication the identified cybersecurity threat and threat actor.

13. The method of claim 12, wherein the search query is a key value pair that filters threat information in IOBs.

14. The method of claim 13, wherein the search query is a reference table configured to apply threat profiles from the threat identification data structure to IOB datasets within the system environment.

15. The method of claim 12, further comprising:

receiving a natural language response representing generation of a search query to identify the cybersecurity threat; and processing the natural language response to generate the search query.

16. The method of claim 12, further comprising:

generating a recommendation of one or more actions in the system environment to address the identified cybersecurity threat and threat actor; and providing the recommendation in the indication.

17. The method of claim 16, further comprising:

automatically implementing the one or more actions in the system environment.

18. The method of claim 16, wherein the one or more actions are based on the determined threat actor.

19. The method of claim 16, further comprising:

simulating one or more IOBs in the system environment to identify the one or more actions.

* * * * *